April 3, 1951
W. P. COHOE
2,547,566
PRODUCTION OF UNFERMENTED BREAD
Filed Aug. 4, 1948
2 Sheets-Sheet 1
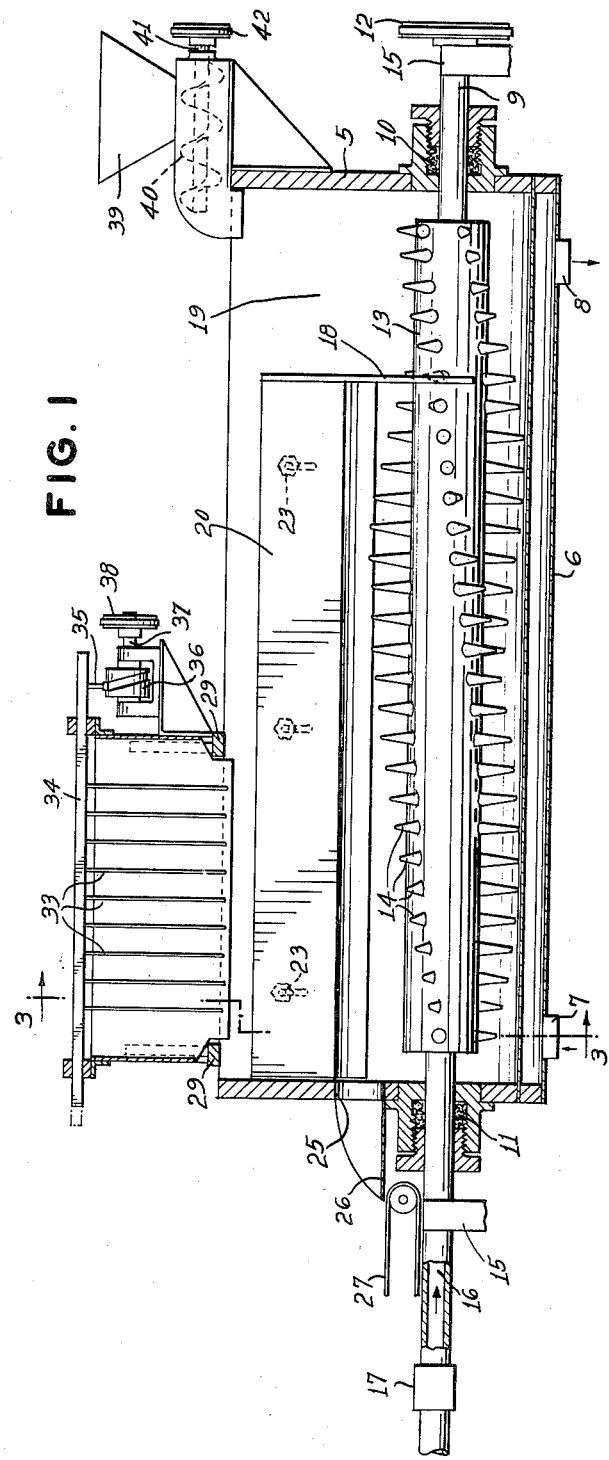
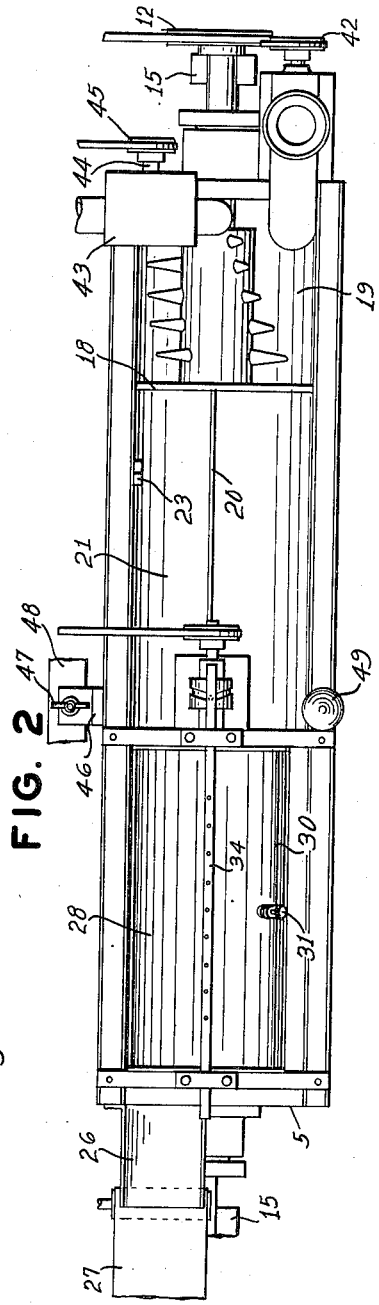
INVENTOR
Wallace P. Cohoe
BY
Pennie Edmonds, Morton and Barrows
ATTORNEYS April 3, 1951 W. P. COHOE 2,547,566
PRODUCTION OF UNFERMENTED BREAD
Filed Aug. 4, 1948 2 Sheets-Sheet 2

INVENTOR
Wallace P. Cohoe
BY
Pennie, Edmonds, Morton and Barrows
ATTORNEYS

Patented Apr. 3, 1951

2,547,566

UNITED STATES PATENT OFFICE 2,547,566

PRODUCTION OF UNFERMENTED BREAD

Wallace P. Cohoe, New York, N. Y.

Application August 4, 1948, Serial No. 42,497

6 Claims. (Cl. 99—90)

This invention relates to the production of unfermented bread and particularly to a method of and apparatus for preparing bread in a more expeditious and economical manner.

For centuries, bread has been made by a process which depends upon the fermentation of dough by the action of yeast or leaven in order to afford the desired vesiculation of the finished bread. Since time must be allowed for propagation of the yeast, the process is relatively slow. For example, 6 to 7 hours elapses between the mixing of the ingredients and the baking of the bread. While this is of slight importance in the preparation of home baked bread, it introduces a considerable item of expense in the large-scale manufacture of bread in modern bakeries where a large part of the bread consumed is prepared.

It is the object of the present invention to provide a rapid and economical method of preparing bread and dough therefor without the delay necessary for fermentation.

Another object of the invention is the provision of a method of vesiculating bread dough by the addition thereto of a gaseous vesiculating agent.

A further object of the invention is the provision of apparatus adapted to mix and to work the ingredients of bread dough, to add a vesiculating agent thereto, and to produce thereby in a continuous manner a dough which is ready for baking.

Other objects and advantages of the invention will be apparent as it is better understood by reference to the following specification and the accompanying drawing, in which Fig. 1 is a longitudinal section through an apparatus adapted for the practice of the invention;

Fig. 2 is a plan view thereof;

Figure 3:
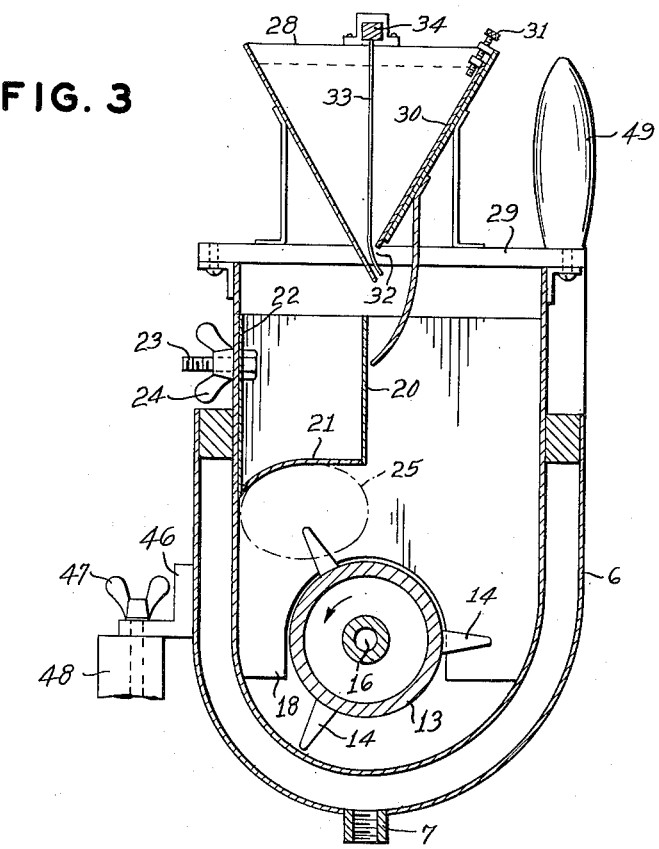
Fig. 3 is a section on the line 3—3 of Fig. 1.

In accordance with the present invention, the necessary ingredients, flour and a liquid such as water or water and milk, together with salt or other condiments and shortening, if desired, are introduced continuously and in proper proportions to a mixing chamber where the ingredients are properly mixed. The mixture is advanced through a working chamber in which the dough is subjected to mechanical action for the purpose of developing the elastomeric properties of the gliadin in the flour, an operation comparable to kneading.

In order to prevent degradation of the gliadin, which would result in the production of a stringy dough, the mass is preferably cooled during the operation to a temperature approaching 32° F. It should not be cooled to the freezing point. On the other hand, the temperature should be at least below 40° F. in order to ensure the production of a satisfactory dough. The cooling has another advantage in that it prevents the sticking of the dough to the agitating device which effects the working or kneading.

The dough is advanced continuously under the conditions noted, and at a point remote from the mixing chamber the vesiculating agent is added, preferably in the form of finely divided solid carbon dioxide. The exact state of division of the solid carbon dioxide is not critical, but it should preferably be reduced to a condition in which it approximates granulated sugar in order that the solid carbon dioxide may be thoroughly disseminated through the dough with no very large particles. The working operation is preferably conducted so that the dough is folded and the particles of solid carbon dioxide are entrapped within the folded dough and thus thoroughly mingled therewith. A part of the vesiculating effect of the solid carbon dioxide is believed to be due to solution of a portion of the gas emanating therefrom in the liquid constituent of the dough. However, some of the particles of solid carbon dioxide are entrapped as such and when examined are found to be surrounded by a layer of water ice resulting from the freezing of the liquid of the dough about the particles. The water ice affords a heat insulating agent which tends to maintain the solid particles of carbon dioxide in the solid condition within the mass of dough.

Following the addition of solid carbon dioxide, the dough continues to be advanced to an extrusion orifice at the end of the chamber in which the dough is worked. The dough is extruded through the orifice and may be delivered to conveying means in the form of an approximate cylinder. Pieces may be cut from the cylinder as the dough is extruded and placed in pans for baking. As the solid carbon dioxide passes to the gaseous phase, it forms vesicles of gas within the dough, causing it to rise in a manner similar to the raising of bread as a result of fermentation. Moreover, as the temperature of the dough rises, carbon dioxide dissolved in the liquid constituent may be released, affording additional vesiculation. In any event, the dough produced in the manner described may be placed in pans and baked, either immediately or after a brief period to permit the formation of the gas vesicles in the dough.

As a result of the operation, it is possible to produce bread of a sufficiently lofty structure to satisfy normal requirements. Most of the time normally required for preparing bread by means of yeast is saved, and since the operation can be conducted in a continuous manner, the method lends itself particularly to the manufacture of bread in commercial bakeries.

The particular ingredients employed form no part of the present invention, since any suitable bread formula may be used and many variations are possible. The following examples are given, therefore, merely to indicate suitable formulae, and without any intention to limit the invention to those described.

*Example I*

Flour, 1500 grams
Milk (whole), 375 cc.⎫ 50% on Flour
Water, 375 cc. ⎭
Salt, 30 grams
Shortening, 20 grams

*Example II*

Flour, 1300 grams
Water, 408 cc. ⎫ 60% on Flour
Milk (whole), 408 cc.⎭
Salt, 12 grams

*Example III*

Flour, 1500 grams
Water, 450 cc. ⎫ 60% on Flour
Milk (whole), 450 cc.⎭
Salt, 30 grams
Shortening, 60 grams

*Example IV*

Flour, 1000 grams
Milk (whole), 320 cc.⎫ 64% on Flour
Water, 320 cc. ⎭
Salt, 20 grams
Polyoxyethylene stearate, 20 grams

*Example V*

Flour, 1350 grams
Milk (whole), 388 cc.⎫ 65% on Flour
Water, 388 cc. ⎭
Salt, 20 grams
Shortening, 12 grams

*Example VI*

Flour, 1500 grams
Water, 1000 cc.—75% on Flour
Salt, 30 grams
Sugar, 90 grams
Shortening, 60 grams
Milk solids (non-fat), 180 grams It will be understood that while the formulae are stated in terms of grams and cubic centimeters, this is merely to represent proportions, and that larger quantities may be employed in the same relative proportions.

Referring to the drawing, 5 indicates a container which may be constructed of any suitable material, for example stainless steel. The container has a jacket 6 with an inlet connection 7 and an outlet connection 8 through which a suitable coolant may be circulated. The coolant may be brine or a cold gas such as freon. The precise material used is unimportant, so long as the temperature may be regulated to maintain the dough within the temperature range indicated during the operation.

Extending through the container 5 is a shaft 9 which enters through a stuffing box 10 and extends to a stuffing box 11 at the opposite end. The shaft 9 is adapted to be driven by means of a gear or pulley 12 from any suitable source of power. It carries within the container 5 a roller 13 having a plurality of studs 14 disposed about it in three or more rows, each row extending helically about the roller through an angle of 120°. The shaft 9 is supported in bearings 15, and one end is hollow, as indicated at 16, and is connected through a pressure joint 17 to a source of coolant which is forced into and through the roller to maintain the temperature thereof and of the studs 14 at the desired low point for the purpose of cooling the dough.

A baffle 18 extends across the container 5 and downwardly about the roller 13, affording an opening at the bottom and forming a mixing chamber 19 in which the ingredients of the dough are initially mixed. After mixing, the dough is carried by the studs 14 beneath the baffle 18 and into a working chamber on the other side thereof where the working or kneading continues. The action of the studs 14 is to tear off sections of the dough and move it forwardly through the working chamber.

A dam 20 extends vertically and longitudinally through the container from the baffle 18 and is provided with a horizontal section 21 extending over the roller 13. Thus, as the roller 13 rotates in the direction of the arrow on Fig. 3, the pieces of dough are squeezed into the space beneath the horizontal section 21 and, because the space is limited, portions of the dough are forced backwardly over the roller 13, effecting a folding action of the dough which improves the texture thereof and affords the possibility of introducing the solid carbon dioxide and of distributing it thoroughly through the dough. The dam 20 and its horizontal section 21 are connected to a wall 22 which is secured by bolts 23 and wing nuts 24 to the wall of the container 5, permitting vertical adjustment of the horizontal section 21 to effect modification of the folding action of the dough. Since the working chamber eventually is filled with dough, which is constantly advancing under the action of the studs 14, the extrusion orifice 25 in the end wall of the chamber 5 permits the passage of dough through the orifice and onto a chute 26 which delivers the dough to a traveling belt 27.

Before the dough is extruded, it must be mixed thoroughly with solid carbon dioxide which is supplied to a hopper 28 supported on a cover plate 29 on the top of the container 5. The hopper is provided with a sliding plate 30 which may be adjusted by means of a screw 31 to modify the size of the orifice 32 at the bottom of the hopper through which the granulated solid carbon dioxide is delivered to the container 5 and to the dough therein. In order to ensure continuous flow of the granulated solid carbon dioxide, a plurality of wires 33 are supported on the bar 34 and depend into the hopper. The bar 34 carries a projection 35 which engages a cam 36 on the shaft 37 which is adapted to be rotated by means of a sprocket or pulley 38 which may be connected to any suitable source of power. Any other similar device adapted to agitate the granulated solid carbon dioxide and to assure free flow thereof may be used. The granulated solid carbon dioxide is fed continuously into the container 5 at a point where it falls into the dough as the latter is being folded as the result of movement against the horizontal section 21 and thus is thoroughly disseminated through the dough.

Figure 4:
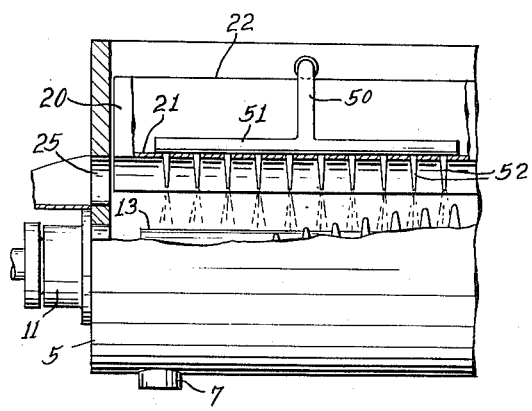
Fig. 4 is a section illustrating a modified form of the apparatus.

Alternatively, liquid carbon dioxide may be delivered from a suitable manifold through small outlets. Upon release of the liquid a considerable portion thereof will be converted to solid carbon dioxide which is folded into the dough precisely as in the preceding embodiment of the invention. Referring to Fig. 4, the structure is as shown in Fig. 1 except for elimination of the solid carbon dioxide hopper. In place thereof, a pipe 50 is connected to a source of liquid carbon dioxide and to a manifold 51 having a plurality of small outlets 52 through which the liquid carbon dioxide is released to the atmosphere within the apparatus adjacent the dough traveling therethrough. Thus solid carbon dioxide is formed and occluded in the dough as it is folded, with the result that it is disseminated through the dough to produce vesiculation thereof.

In the production of baked goods, the formulation of which produces a foam as in the case of sponge cake and batter cakes, air or other gases under pressure may be injected through the outlets 52. Such gas will be distributed through the dough and will produce the desired vesiculation. It is, however, important that the dough be kept at relatively low temperature as hereinbefore described.

In order that the operation may be continuous, flour is fed from a hopper 39 by a screw 40 mounted on a shaft 41 which is driven by a sprocket or pulley 42 from any suitable source of power. The liquid ingredients are supplied from a suitable mixing tank (not shown) to a measuring pump 43 which is adapted to be driven by a shaft 44 carrying a sprocket or pulley 45 which may be driven from the same source of power as the shaft 41, so that they are actuated in unison to feed the desired proportions of the solid and liquid ingredients to the mixing chamber 19. Any water soluble constituents of the mixture may be dissolved in the liquid supplied. Water insoluble ingredients are dispersed in water at moderate temperatures, for example 60° to 70° F. For this purpose a mixing tank with a suitable agitator may be used. The resulting suspension may be fed to the apparatus in proper proportions by a liquid pump such as the pump 43. Suitable means may be employed to regulate the speed of the flour and liquid feeds in order to supply the ingredients at the required rate.

To facilitate the cleaning, it is desirable to permit tilting of the container 5 on the shaft 9. It is normally held in upright position by an angle 46 secured to the side of the container and held by a screw 47 to a block 48. By releasing the screw 47 and actuating the handle 49, the container 5 may be turned about the shaft 9 to afford ready access to the interior thereof. Little cleaning is necessary ordinarily because the low temperature maintained prevents the sticking of the dough to the walls of the container 5 and to the roller 13 and its studs 14. However, cleaning may be effected readily in the manner indicated.

In operating the apparatus as described, the liquid ingredients are mixed with any soluble and insoluble constituents. The flour is fed from the hopper 39, and the liquid constituents and liquid suspensions are similarly fed by the pump 43 in the proper proportions to afford a dough of the desired consistency. This, of course, may vary, depending upon the character of the flour employed. The ingredients falling into the mixing chamber 19 are rapidly mixed and moved by the studs 14 past the baffle 18 into the working chamber where the working of the dough continues as it advances and the granulated solid carbon dioxide is folded into the dough which is eventually extruded in the manner previously described. Thus, in a brief period, which is required to move the dough through the container 5, it is provided with the vesiculating agent which causes it to rise and to produce a satisfactory bread when baked.

Various changes may be made in the structure of the apparatus and in the details of operation thereof, and of the method as described, without departing from the invention or sacrificing the advantages thereof.

I claim:

1. The method of preparing unfermented bread which comprises mixing flour and a liquid in proportions adapted to form a dough, adding granulated solid carbon dioxide to the dough, working the dough to develop the elastomeric properties of the gliadin of the flour and to disperse the solid particles of carbon dioxide into the mass of the dough, withdrawing the dough, and baking it.

2. The method of preparing unfermented bread which comprises mixing flour and a liquid in proportions adapted to form a dough, adding granulated solid carbon dioxide to the dough, cooling the dough to a temperature approaching 32° F., working the dough to develop the elastomeric properties of the gliadin of the flour and to disperse the solid particles of carbon dioxide into the mass of the dough, withdrawing the dough, and baking it.

3. The method of preparing unfermented bread which comprises mixing flour and a liquid in proportions adapted to form a dough, adding granulated solid carbon dioxide to the dough, working the dough to develop the elastomeric properties of the gliadin of the flour and to disperse the solid particles of carbon dioxide into the mass of the dough, extruding the dough, and baking it.

4. The method of preparing unfermented bread which comprises mixing flour and a liquid in proportions adapted to form a dough, adding granulated solid carbon dioxide to the dough, cooling the dough to a temperature approaching 32° F., working the dough to develop the elastomeric properties of the gliadin of the flour and to disperse the solid particles of carbon dioxide into the mass of the dough, extruding the dough, and baking it.

5. The method of preparing unfermented baked goods which comprises mixing the ingredients, cooling the dough to a temperature below 40° F., but not to a temperature sufficiently low to freeze it, expanding liquid carbon dioxide into the space adjacent the dough with the formation of discrete particles of solid carbon dioxide, and working the dough to develop the elastomeric properties of the gliadin of the flour and to disperse the solid particles of the carbon dioxide into the mass of the dough.

6. The method of claim 1 in which the solid carbon dioxide is continuously added during the entire working of the dough.

WALLACE P. COHOE.

(References on following page)

REFERENCES CITED

The following references are of record in the file of this patent:

UNITED STATES PATENTS

| Number | Name | Date |
|---|---|---|
| 29,158 | Garvey | July 17, 1860 |
| 33,432 | Fitzgerald | Oct. 8, 1861 |
| 40,707 | Perry | Nov. 24, 1863 |
| 579,866 | Elworthy | Mar. 30, 1897 |
| 617,866 | Somasco | Jan. 17, 1899 |
| 764,650 | Wieda | July 12, 1904 |
| 1,421,176 | Cremien | June 27, 1922 |
| 2,215,957 | Freilich | Sept. 24, 1940 |
| 2,243,860 | Freilich | June 3, 1941 |

FOREIGN PATENTS

| Number | Country | Date |
|---|---|---|
| 2,174 | Great Britain | of 1875 |
| 7,801 | Great Britain | of 1890 |

OTHER REFERENCES

Comprehensive Treatise on Inorganic and Theoretical Chemistry: Mellor; vol. 6, pages 25 to 33.

Gregory: Uses and Application of Chemicals and Related Materials; vol. I, 1939, page 151.